June 7, 1966          J. KUHN          3,254,571

RECIPROCATING ENGINE VALVE STRUCTURE

Filed Aug. 3, 1964          2 Sheets-Sheet 1

INVENTOR.
JOHN KUHN
BY *Elliott & Pastoriza*
ATTORNEYS

INVENTOR.
JOHN KUHN
BY
*Elliott & Pastoriza*
ATTORNEYS

United States Patent Office 3,254,571
Patented June 7, 1966

3,254,571
RECIPROCATING ENGINE VALVE STRUCTURE
John Kuhn, 645 Las Lomas, Pacific Palisades, Calif.
Filed Aug. 3, 1964, Ser. No. 392,066
13 Claims. (Cl. 91—217)

This application is a continuation in part of my copending patent application Serial No. 311,431 filed September 25, 1963 for Reciprocating Engine Valve Structure, now abandoned.

This invention relates generally to reciprocating engine valve structures and more particularly, to a novel valve structure for internal combustion type engines.

In conventional reciprocating engines, valves are usually operated by direct mechanical connections between the valves and a rotating part of the engine. There are thus involved mechanical linkages, lifting cam members, and the like.

A primary object of the present invention is to provide a novel reciprocating engine valving structure which avoids the use of direct mechanical linkages between a part driven by the engine and the valves themselves to the end that a vast simplification in the mechanics of the engine is realized.

A second object of the present invention is to provide a valving means responsive to the pressure differentials in the flow which the valving means is controlling, which responsiveness will permit automatic changes in the valve action timing for more efficient engine operation under conditions remote from the design point of operation; all without complicated valve gearing.

Briefly, these and other objects and advantages of the invention are attained by providing, in a reciprocating wall or enclosing structure, suitable lateral valve ports together with a valve means contained wholly within the enclosure and adapted to slidingly engage the interior wall of the enclosure. The arrangement is such that when the enclosure is reciprocated, the valve structure is responsive to inertia forces established to reciprocate in a back and forth motion with a given lag depending upon the inertia of the valve structure. Any pressure differentials across the wall can then change the force with which the valve means engages the wall to the end that the valve means is substantially locked to the wall until a force, such as the inertia force induced by reciprocation, overcomes the locking means energized by the pressure differential. The valve structure, in moving between first and second positions, functions to cover and uncover the lateral ports in the enclosure.

In a preferred embodiment of the invention, there are provided outer and inner enclosures which may take the form of cylinders each provided with lateral ports and each incorporating a suitable sliding valve structure. The outer and inner cylinders are arranged to reciprocate 180° out of phase with respect to each other, and their corresponding outer and inner valve structures execute similar reciprocating motions in response to inertia forces created by the reciprocation of the enclosures. When a pressure is developed within the inner enclosure such as by burning gases or any other pressure source of gas, the gas is passed alternately to opposite interior portions of the outer enclosure thereby effecting the desired reciprocating motion of the inner and outer enclosures. As stated, this reciprocating motion gives rise to inertia forces to actuate the outer and inner valve structures so that the ports are opened and closed at proper timed intervals to effect the desired engine action.

The valve means in the above described enclosures are split rings which move outward under the influence of an outward pressure differential to frictionally engage the inner surfaces of the enclosures. The valves are then locked to their respective enclosures and are unresponsive to the inertia forces until the outward pressure differential diminishes below a prescribed level or is succeeded by an inward pressure differential. With an inward pressure differential, the valve would collapse inward away from the inner surface of the enclosure and would disengage itself from any locking means, as frictional contact, which would retain its motion relative to the wall.

A better understanding of the invention as well as various further details and advantages thereof will be had by now referring to the acvcompanying drawings, in which.

Figure 1:
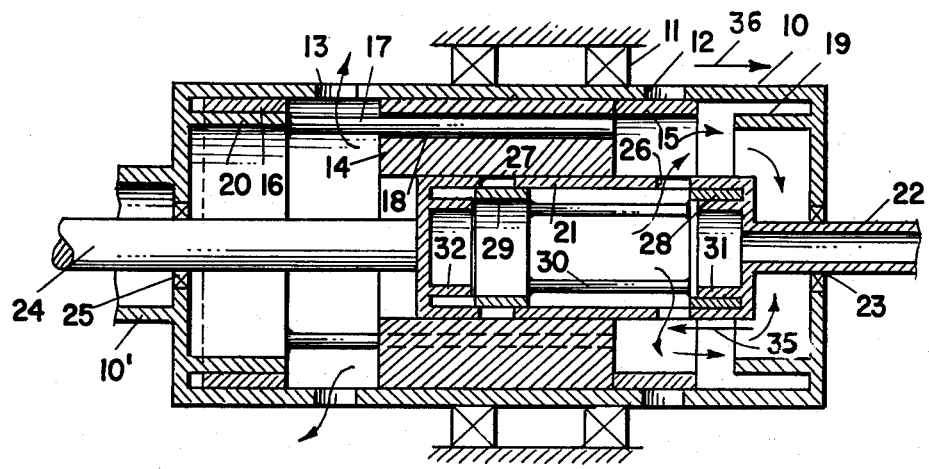
FIGURE 1 is a side cross-sectional view of certain portions shown in full line of the principal engine components and valve structure in accordance with the invention with the components in first positions.

Referring first to FIGURE 1 there is shown an outer enclosure or cylinder 10 mounted by stationary bearings 11 for back and forth reciprocating movement. The limits of reciprocation are controlled by power take-off sleeve 10' which may be linked to a suitable flywheel (not shown). The wall of the enclosure 10 includes right and left lateral ports 12 and 13. Between these ports there is provided an annular radially inwardly extending sleeve 14 rigidly secured to the interior wall of the enclosure 10.

A first valve structure including right and left annular rings 15 and 16 secured together for simultaneous back and forth movement, as by strut rods 17, is disposed within the enclosure 10 in sliding engagement with the wall of the enclosure. The spacing between the rings 15 and 16 is greater than the spacing between the right and left ports 12 and 13 such that when the ring 15 covers the port 12, the ring 16 extends beyond the port 13 so that the port 13 is open. When the sliding valve structure is in a second position, the port 12 will be open and the port 13 covered by the ring 16. The struts 17 pass through small bores such as indicated at 18 in the sleeve 14 so that the rings 15 and 16 will move simultaneously.

Suitable stop means in the form of annular cavities defined by end flange structures 19 and 20 are provided for receiving the rings 15 and 16 respectively at the limits of their travel. These rings function as plungers received within the annular cavities defined by the flanges 19 and 20 so that gas or air trapped within the annular cavities can pass out only slowly through the small clearance. There is thus provided a pneumatic cushioning effect to cushion the end of movements of the valve structure.

Within the enclosure 10 there is provided an inner enclosure or cylinder 21 provided with an extending tube 22 passing through the right end of the enclosure 10 and bearingly supported thereto as by bearings 23. The left end of the inner cylinder 21 includes a power take-off shaft 24 reciprocably mounted in bearings 25 at the other end of the enclosure 10. The arrangement is such that the inner cylinder 21 may reciprocate within the sleeve 14 relative to the enclosure 10. The enclosure 10 in turn may reciprocate relative to the stationary bearings 11, the reciprocating movements being substantially 180° out of phase.

A compressed combustible mixture or expanding gases or other sources of compressed gases may be provided to the interior of the inner cylinder 21 through the tube 22 extending from the right of the enclosure 21. Power from the engine is transmitted through the reciprocating shafts 10' and 24, which may be connected through suitable links to suitable flywheels or equivalent structure (not shown).

The inner cylinder 21 includes right and left lateral ports 26 and 27 and incorporates an inner valve structure in the form of right and left rings 28 and 29 respectively. These rings are connected together for simultaneous sliding movement against the interior wall of the cylinder 21 as by struts 30.

As in the case of the outer valve structure, there are provided suitable stop means in the form of annular flanges 31 and 32 defining annular cavities for receiving the rings 28 and 29 at the limits of their reciprocating travel. As also in the case of the outer cylinder and valve structure, the spacing between the inner rings 28 and 29 is greater than the spacing between the lateral inner ports 26 and 27 so that when the port 26 is open the port 27 is covered when the rings are in their first position and when moved to the left to a second position, the port 27 is open and the port 26 closed.

Figure 2:
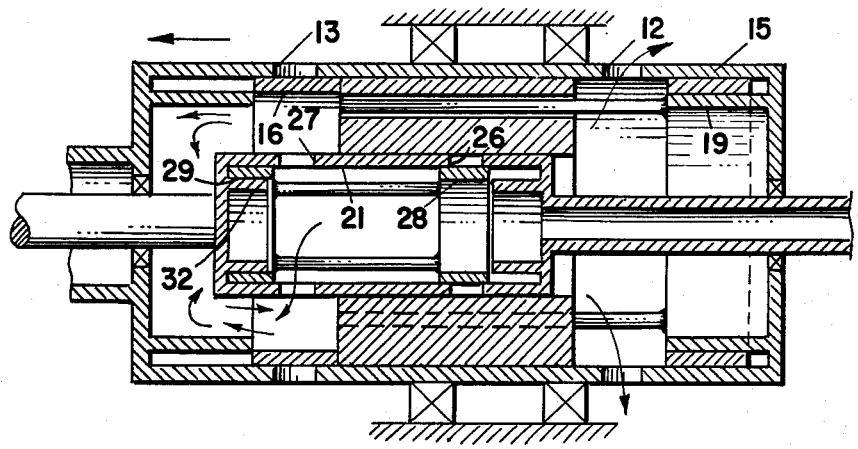
FIGURE 2 is a view similar to FIGURE 1 illustrating the same components in second positions.

FIGURE 2 illustrates the relative positions of the inner and outer cylinders 10 and 21 and the valve structures when they have moved in opposite directions to second positions respectively, from those shown in FIGURE 1. Thus in FIGURE 2, it will be noted that the outer lateral left port 13 is closed by the ring 16 while the right lateral outlet port 12 is open, the ring 15 being received within the annular cavity defined by the flange 19. Similarly, the right inner cylinder port 26 is closed by the inner valve ring structure 28 and the left inner port 27 is opened, the left inner valve ring 29 being received within the annular cavity defined by the flange 32.

Figure 3:
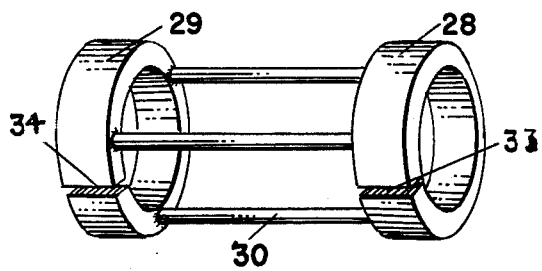
FIGURE 3 is a perspective view of a part of one of the valve structures incorporated in the drawings of FIGURES 1 and 2.

FIGURE 3 illustrates in perspective the inner valve structure. As shown, the right and left rings 28 and 29 extend annularly about the entire inner wall of the enclosure. While only three struts or rods 30 are shown, additional ones could be provided. The rings 28 and 29 are split as indicated at 33 and 34.

In the operation of the reciprocating engine, the valve rings are initially positioned as shown in FIGURE 1. A fuel-oxidizer mixture is then fed to the inner cylinder 21 through the right hand extending tube 22 and may be ignited within the cylinder 21 by any suitable means. Alternatively, any suitable gas may be supplied thereto under pressure. Assuming that the inner and outer cylinders are in the positions illustrated in FIGURE 1, the expanding gases within the inner cylinder 21 will pass out the ports 26 to the right hand interior portion of the outer cylinder 10. Since the right hand ring 15 of the outer valve structure covers the ports 12, the gases will be trapped within the right interior portion of the outer cylinder 10. Some slight leakage may exist through the bore 18 accommodating the struts 17 as well as past the valves 15 and 29.

Because of the high pressure of gases within the right end interior portion of the outer cylinder 10, the inner cylinder 21 will be driven to the left in the direction of the heavy arrow 35 and the outer cylinder 10 will be driven to the right in the direction of the heavy arrow 36 as shown. These motions are guided by the bearings 23, 25 and stationary bearing 11 respectively.

As the open ports 26 pass under the sleeve 14, further flow therethrough is substantially cut off by the close clearance between the sleeve and the inner cylinder 21. As a result, the gases in the right interior portion of the cylinder 10 continue to expand to a lower pressure. By judicious choice of the length of the sleeve 14 and of the areas of structures 21 and 10 in the direction of motion with respect to the pressures and temperatures existing inside the cylinder 21 at the start of the stroke, the right chamber pressure will fall to a value lower than that existing on the exterior of the structure 10. There will then exist a pressure differential tending to force ring 15 inwardly and release the frictional restraint tending to hold this ring from endwise motion. It may be noted that the left interior portion of the cylinder 10 has meanwhile been emptied of its gaseous contents by the continued differential motion of the cylinders 10 and 21.

When the outer cylinder 10 approaches its rightward limit, the inertia of the outer valve rings 15 and 16 will result in their tending to continue to move to the right thereby resulting in the ring 15 being received in the annular cavity defined by the flange 19 to open the port 12 and the left ring 16 moving from the annular cavity defined by the flange 20 to cover the port 13. This relative position of the valve rings for the outer cylinder 10 is illustrated in FIGURE 2.

The continued differential motion of cylinders 10 and 21 compresses the remaining gases trapped in the left interior portion of cylinder 10 by the covering of port 13 by ring 16. This resultant pressure rise tends to diminish the pressure differential with respect to the pressure at the interior of the inner cylinder 21 across ring 29 which is still closing port 27. This lowering of the pressure differential also diminishes the frictional restraint on the ring 29 which is tending to prevent axial motion of this ring under inertia loads.

As the shaft 24 approaches the end of its stroke in a leftward direction, the inertia of the innner valve rings 28 and 29 will result in their tending to continue to move to the left, thereby resulting in ring 29 being received within the annular cavity defined by the flange 32 and the cylinder 21. This leftward motion uncovers the port 27 while the right valve ring 28 will move to cover the port 26. This position of the valve rings 28 and 29 is also illustrated in FIGURE 2.

When the valves are positioned as shown in FIGURE 2, the compressed gases within the inner cylinder 21 will then pass through the ports 27 to the left end interior portion of the outer cylinder 10, these gases being trapped therein since the left outer ports 13 are closed by the ring 16. The expanding gases will then cause the outer cylinder 10 to reciprocate to the left and the inner cylinder 21 to move to the right. The ports 27 will be cut off by sleeve 14 during this stroke in the same manner as described above with respect to port 26. The pressure in the left interior portion of the cylinder 10 will then fall to a pressure lower than that in the exterior of the cylinder 10. The inertia of the valve rings will keep them in their positions as illustrated in FIGURE 2 until the respective left and right hand accelerations of the outer and inner cylinders again reverse at which time the valve structures will tend to move relative to their enclosures. The pressure differentials across rings 16 and 28 will frictionally restrain such motion until the pressure differentials decrease and the friction forces with them so that the valve structures will by inertia move to their positions shown in FIGURE 1 and the cycle will then repeat. The pressure differential determined sequencing previously described of the outer valve moving first and the inner valve moving second will also be repeated.

It will thus be evident that the valve ring structures are responsive to the inertia forces created as a consequence of the reciprocating motion itself resulting from the alternate application of compressed gases to the interior right and left hand end portions of the outer cylinder 10.

Because of the annular cavities receiving the rings being farily closely machined to provide only a small clearance for the rings themselves, a pneumatic cushioning effect is afforded to the valve structures so that they will be gradually stopped without severe wear as the motion changes direction.

The splits such as at 33 and 34 in the valve rings permit them to expand radially slightly so that the pressure of the gases will tend to hold the rings against the side walls of the respective cylinders when the pressure differential between the interior and exterior of either the outer or inner cylinders is above a given value. When this pressure differential drops during deceleration as the limits of the reciprocating movements of the cylinders are approached, the valves are free for sliding movement. This feature in addition to the inertia effects insures that the valves will stay in one set position as long as a given pressure differential exists so that proper phase relationships are maintained.

It will be apparent that the pressure differential determined sequencing of the valves is somewhat independent on the pressure levels existing in the engine since the higher pressure differential across the inner cylinder will always exert a greater retarding force on the inner valve rings than that generated on the outer valve rings. Further a low pressure level will have the effect of letting the valves move earlier with respect to the degree of completion of the reciprocation than will a high pressure level. If the engine components be selected for maximum flows at high pressures to produce large power outputs, this valve characteristic can be of benefit in reducing flow demands at small power outputs with little change in speed in order to minimize fuel consumption. This benefit arises from the fact that, at low pressure levels, the outer cylinder valve will move under the low inertia forces developed soon after the middle of the stroke. The resulting outer valve closure traps a large amount of gas in the adjacent chamber. The compression of this gas not only causes the opening of the inner cylinder valve as described before, but forces some of the gas back into the inner cylinder. This recirculated gas flows out again for a fraction of the succeeding lower stroke, thus reducing the demand for gas from the inner cylinder. These valves, therefore, automatically reduce the gas flows required at low power demands.

A further feature of this invention resides in the thermal characteristics of the valve rings. Any leakage of hot gases through the ports heats the exterior surface of the rings resulting in expansion of the rings to thereby urge such surface more tightly against the port area.

It will be evident from the foregoing, that a proper valving for reciprocating operation of the engine is realized without mechanical connections between the power output shaft 24 for the engine and the valves themselves. Further, the automatic changes in valving action, induced by the pressure differentials in the flows these valves are controlling, provides for efficient operation of the engine under many different operating conditions. Thus, the use of inertia forces to cause valve action and of pressure differential forces to restrain that valve action until a time for efficient action has been reached provides, in combination, a new and useful improvement in the art of valving in reciprocating engines.

Figure 4:
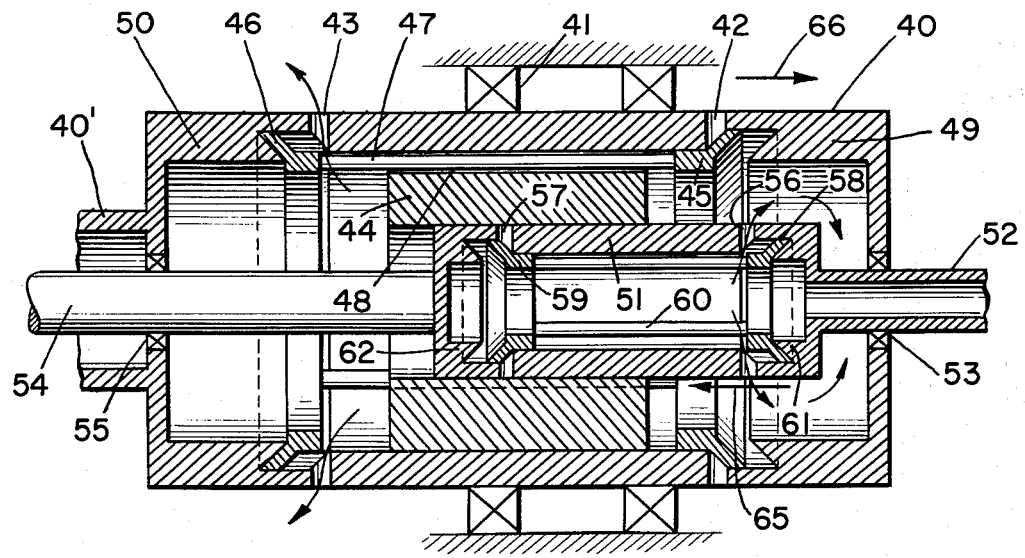
FIGURE 4 is a cross-section of a modified embodiment of the invention.

FIGURE 4 illustrates a modified engine structure for taking better advantage of the pressure differentials. In this modification the outer cylinder 40 is again mounted in stationary bearings 41 for back and forth reciprocating movement. As in the case of the embodiment of FIGURE 1, power may be taken from the sleeve 40' by a suitable linkage (not shown) to a flywheel. The wall of the cylinder 40 is thickened over that of the cylinder 10 of FIGURE 1 and provided with right and left lateral parts 42 and 43 opening interiorly on slanting annular surfaces. A sleeve 44 is disposed between the parts as shown.

A first valve structure includes right and left annular rings 45 and 46 including outwardly flared or beveled portions for registering with the slanting annular surfaces at the openings of the ports. Suitable strut rods 47 pass through bores 48 in the sleeve and secure the rings in spaced relationship.

Suitable stop means in the form of annular slanting surfaces 49 and 50 serve to limit movement of the first valve structure as described.

The inner cylinder 51 is supported by tube 52 in bearings 53 and by shaft 54 in bearings 55 in the same manner as the inner cylinder 21 in FIGURE 1. This inner cylinder includes right and left ports 56 and 57 which open interiorly on slanted annular surfaces. A second valve structure includes annular rings 58 and 59 with flared or beveled ends to register with the slanting surfaces. These rings are supported by struts 60 and are limited in movement by slanting stop surfaces 61 and 62.

Figure 5:
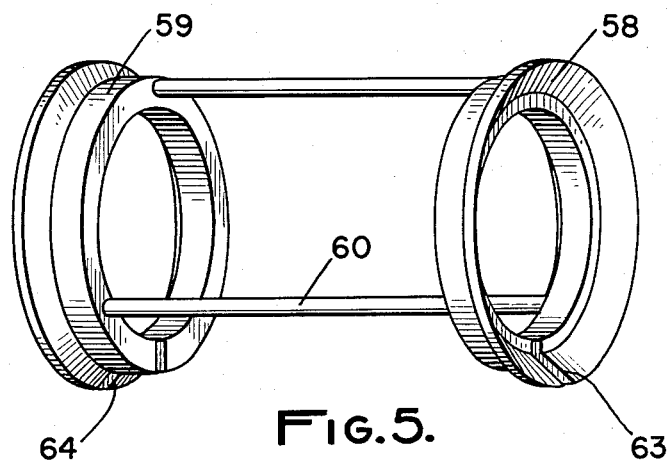
FIGURE 5 is a perspective view of the valve portion of FIGURE 4.

FIGURE 5 illustrates the rings 58 and 59 in perspective and these rings may be split as at 63 and 64.

The operation of the structure of FIGURE 4 is the same as the embodiment of FIGURES 1 and 2, the inner and outer cylinders reciprocating in opposite directions as shown by the arrows 65 and 66. The principal difference resides in the provision of the slanting surfaces and flared or beveled ring structures for the valves which provides a projected area normal to the axis of the cylinders upon which the pressure differentials may act.

It will be appreciated from the foregoing description that the valving action in either of the embodiments may be incorporated in any type of reciprocating engine whether it be operated by compressed air, internal combustion of gases, or equivalent pressure-generating means.

While only two particular embodiments of the invention have been set forth and described, various changes that fall clearly within the scope and spirit of the invention will occur to those skilled in the art. The reciprocating engine valve structure is therefore not to be thought of as limited to the exact embodiments set forth merely for illustrative purposes.

What is claimed is:

1. A reciprocating engine including, in combination: a wall having at least one port therethrough; limit stop means positioned on either side of said port in the direction of reciprocation; a valve means adapted to move between said limit stop means in response to the inertia forces created by the reciprocation of the wall so as to cover said port when against one of said limit stop means and uncover said port when against the other of said limit stop means, and a pressure hold means whereby said valve means is made responsive to a pressure differential across the port to tend to hold the valve means from moving from the port.

2. A reciprocating engine according to claim 1, in which said limit stop means includes a cavity receiving at least a part of said valve means, said part constituting a plunger structure having a close fit in said cavity to provide pneumatic cushioning means to stop movement of said valve means.

3. A reciprocating engine including, in combination: a reciprocably mounted outer enclosure having one wall with right and left lateral ports longitudinally spaced along the direction of reciprocation; a sliding valve means in said enclosure adapted to slide along said wall between a first position in which said right port is closed and said left port is open, and a second position in which said right port is open and said left port is closed, said valve means being responsive to inertia forces created upon reciprocation of said enclosure to move between said first and second positions; an inner enclosure reciprocably mounted within said outer enclosure and including inner right and left lateral ports communicating with the interior of said outer enclosure; and an inner sliding valve structure adapted to slide within said inner enclosure between a first position in which said inner right port is open and said inner left port is closed and a second position in which said inner right port is closed and said inner left port is open, said inner enclosure reciprocating approximately 180° out of phase with said outer enclosure and said inner valve structure being responsive to inertia forces created by reciprocation of said inner enclosure to move between its first and second positions whereby the interior of said inner enclosure is alternately placed in communication with opposite interior portions of said outer enclosure.

4. A reciprocating engine according to claim 3, including a sleeve secured within said outer enclosure disposed midway between said outer right and left lateral ports, said inner enclosure being reciprocably mounted in said sleeve and forming a close clearance with said sleeve so that said inner right and left lateral ports are respectively cut-off from communication by said sleeve during a portion of the reciprocating movement of said inner enclosure.

5. A reciprocating engine comprising, in combination: an outer cylinder mounted to a stationary structure for reciprocating movement and having right and left lateral ports in its said wall and including a central sleeve extending radially inwardly between said ports; an outer valve structure including right and left annular rings slidingly engaging the inner wall of said outer cylinder and spaced apart a distance greater than the distance between said ports and connected together for simultaneous sliding movement so that when said right port is covered by said ring, said left ring is located beyond said left port so that said left port is open, and when said left port is covered by said left ring, said right ring is located beyond said right port so that said right port is open; and an inner cylinder mounted within said sleeve for reciprocating movement relative to said outer cylinder and forming with said sleeve and the interior of said outer cylinder left and right interior chamber portions, said inner cylinder including inner cylinder left and right lateral ports located for communication with said left and right interior chamber portions, respectively, and cut off from communication by the sleeve during a portion of the reciprocation of said inner cylinder; an inner valve structure including left and right annular rings slidingly engaging the inner wall of said inner cylinder and spaced apart a distance greater than the distance between said inner cylinder ports and connected together for simultaneous sliding movement so that when said inner cylinder right port is covered by said right ring, said left ring extends beyond said inner cylinder left port so that said left port is open, when said left port is covered by said left ring, said right ring extends beyond said inner cylinder right port so that said right port is open, said outer and inner valve structures following reciprocating movements of said outer and inner cylinders respectively with a time lag resulting from the inertia of said valve structures whereby gas pressure in said inner cylinder is alternately communicated to opposite interior portions of said outer cylinder, said gas pressure being exhausted from one of said interior portions to the exterior of said outer cylinder when gas pressure from said inner cylinder is provided in the interior portion of said outer cylinder opposite to said one interior portion.

6. A reciprocating engine according to claim 5, including annular cavities formed in the inner end portions of said outer and inner cylinders for receiving said left and right wing portions of said outer and inner valve structures at the extreme limits of their travel to provide pneumatic cushioning of said structures.

7. A reciprocating engine according to claim 5, in which said right and left rings for said outer and inner valve structures are split so that they may expand radially against the inner wall surfaces of said outer and inner cylinders respectively, the pressure differential between the interior and exterior of said outer and inner cylinders respectively expanding said rings to hold them in a set position with respect to said cylinders until said pressure differential drops below a given value.

8. A reciprocating engine according to claim 7, in which heating of said rings thermally expands said rings into tighter engagement with the walls of said cylinders.

9. In combination: a wall mounted for reciprocation and having a port therethrough and having a first and second limit stop means positioned on opposite sides of the port in the direction of reciprocation; a valve means adapted for motion between said stop means in response to inertia forces created by the reciprocation of the wall and adapted to cover the port when against the first limit stop means and to uncover the port when against the second limit stop means; and valve restraining means responsive to a pressure differential across the wall and adapted for restraining the valve from motion from the first limit stop means when subjected to said pressure differential.

10. The combination of claim 9, wherein the first limit stop means and the valve restraining means are combined into a surface on the wall and surrounding port and at a slant to the direction of motion, and the valve means is adapted to fit to the surface when the valve means covers the port; the slant of the surface offering a projected area in the valve to the pressure differential, the force on the projected area developed by the pressure differential tending to hold the valve from motion from the surface.

11. The combination of claim 9 wherein the valve restraining means is the frictional contact between the valve and the wall induced by the pressure differential.

12. The combination of claim 9 wherein the valve restraining means is a recess in the wall, into which recess the valve is forced by the pressure differential.

13. In a device undergoing reciprocation: a wall having a surface disposed at an angle to the direction of reciprocation and having a passage opening on the surface and having limit stop means spaced from the passage in the direction of reciprocation; a valve means adapted for seating on the surface and closing off the passage and adapted for motion in the direction of reciprocation responsive to said reciprocation between said surface and the limit stop means and adapted for uncovering the passage when against the limit stop means; the valve cooperating with the angled surface and the passage and with a pressure differential across the valve to develop a force tending to prevent motion of the valve from the surface in response to the reciprocation.

References Cited by the Examiner
UNITED STATES PATENTS

| | | | |
|---|---|---|---|
| 695,664 | 3/1902 | Albree | 91—235 |
| 1,890,010 | 12/1932 | Vickers | 60—52 |
| 2,012,861 | 8/1935 | Woolson | 91—376 |

SAMUEL LEVINE, *Primary Examiner.*